Jan. 12, 1965          G. BARKAN          3,164,869

CLOSURE STRUCTURE

Original Filed Oct. 30, 1958          3 Sheets-Sheet 1

INVENTOR
GEORGE BARKAN
BY
*J. F. Basseches*
ATTORNEY

Jan. 12, 1965 G. BARKAN 3,164,869
CLOSURE STRUCTURE
Original Filed Oct. 30, 1958 3 Sheets-Sheet 2
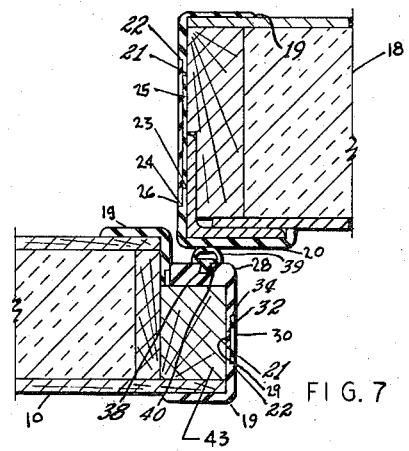
FIG. 7
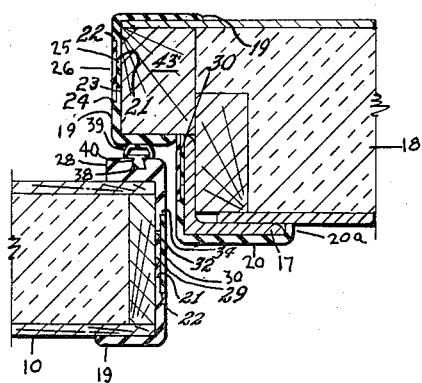
FIG. 8
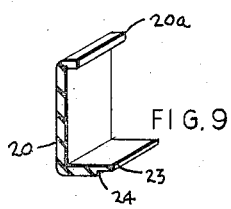
FIG. 9
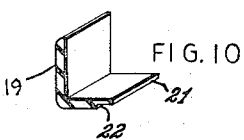
FIG. 10
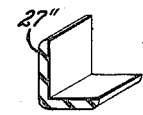
FIG. 14
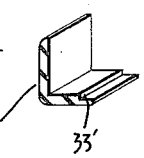
FIG. 17
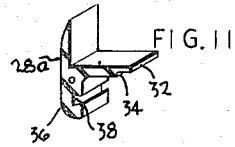
FIG. 11
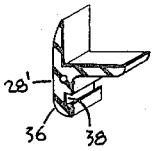
FIG. 15
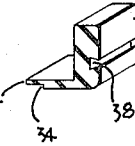
FIG. 16
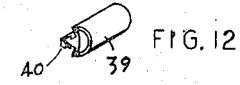
FIG. 18
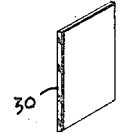
FIG. 12
FIG. 13
INVENTOR
GEORGE BARKAN
BY
*J. H. Basseches*
ATTORNEY

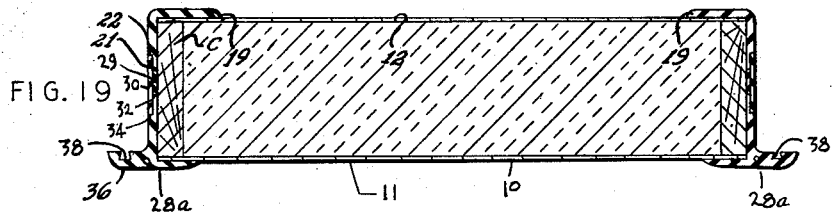
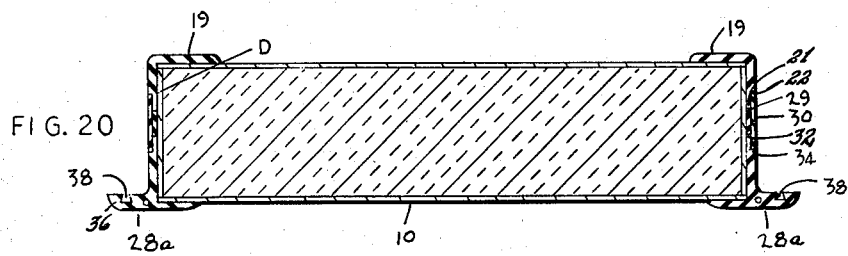
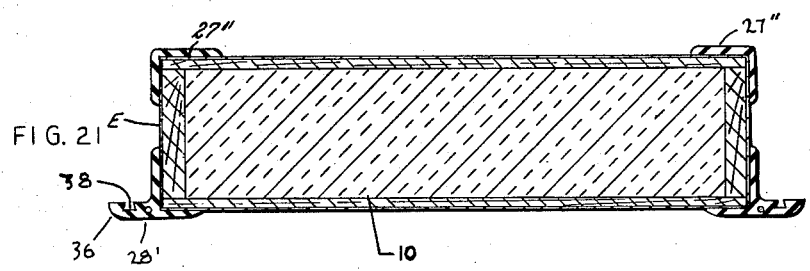
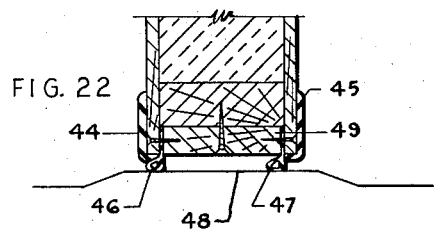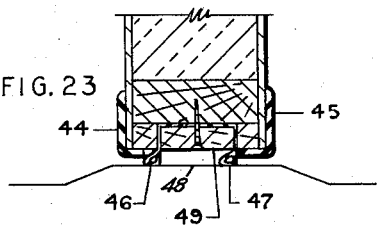
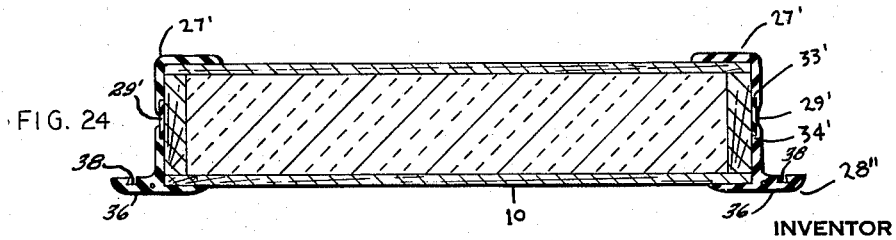
INVENTOR
GEORGE BARKAN
BY
ATTORNEY

United States Patent Office 3,164,869
Patented Jan. 12, 1965

3,164,869
CLOSURE STRUCTURE
George Barkan, Yonkers, N.Y., assignor to Marine Appliances Inc., New York, N.Y., a corporation of New York
Continuation of application Ser. No. 770,659, Oct. 30, 1958. This application Oct. 23, 1961, Ser. No. 147,098
9 Claims. (Cl. 20—69)

This invention relates to closure structures, and more particularly to a structure intended to seal access spaces, such as to refrigerated spaces.

Still more particularly, this invention relates to closures for refrigerated storage spaces and the like wherein effective sealing is necessary, as for maximum heat insulation.

This invention relates further to novel sealing members arranged to be applied to doors and door casings, to provide a high degree of heat insulating efficiency.

Still further, this invention relates to doors and like closure media wherein it is desired to provide maximum sealing efficiency in a structure which is relatively light weight when compared with similar door closure structures heretofore known.

Still further this invention relates to a door structure with the qualities aforesaid which may be made of a core component of substantially air-trapped and relatively permeable material, thereby permitting the use of light weight expedients, such as heat insulating fiber glass and "Styrofoam," the use of such sheeted door materials being made feasible by reason of novel sealing means to make the structures resistant to the stresses and strains attendant upon frequent opening and closing of the doors, and to the absorption of odors and the like.

The invention is a revolutionary concept in and for the manufacture of refrigerator doors of high thermal and structural efficiency and operating safety under the severe usage prevailing in refrigerated spaces aboardship and ashore.

Large refrigerated spaces, such as those found in cafeterias, hospitals and like land installations, as well as those found on ships, are, in accordance with known practice, provided with doors having heat insulating values substantially conforming with the insulating values of the remainder of the refrigerated space. In the past, such doors have normally consisted of hollow wooden or stainless steel clad structures which have been filled with insulating material, such as asbestos, glass wool, or other known equivalents of the latter. Such known door structures, when properly fitted, and if not abused, in a measure perform the function of sealing the refrigerated space against loss of heat. A primary disadvantage of such known door structures, however, lies in their great weight; for instance a 2'9½" by 5'3½" door, having six inch insulation thickness, may weigh almost three hundred and twenty-five pounds. It will be readily recognized that the use of such exceedingly heavy doors involves complex installation and maintenance problems since, obviously, extremely heavy hanging hardware for the initial installation will be found necessary and, likewise, warping and distortion of the door, particularly after heavy use, will compromise the sealing quality of the closure.

More particularly, this invention combines an original and novel design of refrigerator door components, which simplifies the manufacture, speeds up the production and at the same time provides substantial inventory economies.

Attempts by the industry to form plastic or like doors having integrally molded overhanging portions provided with gaskets to abut the face portions of door casings or frames has not provided a solution to the problem since the operation of forming such overhanging portions greatly increases the cost of fabricating the door and, further, such integral overhangs tend to break up under the repeated shocks incident to closing or slamming of the door.

By my invention I provide novel door edge sealing members which are adapted, with relatively minor and economical changes, to be applied to the edge portions of light weight insulating panel or sheet materials of varying sizes to form a thermal, non-conductive edge portion on such materials, thereby adapting such materials to be formed into integral edge-sealed doors, with a minimum of additional labor.

Accordingly, it is an object of my invention to provide a light weight door structure for refrigerated spaces and the like with high sealing efficiency.

A further object of my invention is to provide a closure construction including a door frame or casing and door wherein the entire structure is provided with an effective peripheral thermal seal.

Still a further object of my invention is to provide sealing members as aforesaid whereby the edge portions of door and door frames form effective thermal "breaks," thereby rendering the latter available as closures for refrigerated spaces and the like.

Still a further object of my invention is to provide sealing members which are adapted to be used to seal edge portions of doors, door frames and the like, of a wide variety of thicknesses.

Still a further object of this invention is to provide door edge overlay members which may, without change, be used to seal the edge portions of doors and door frames of a wide variety of thicknesses.

Still a further object of this invention is to provide a door structure as aforesaid having a novel door-to-door frame seal, thereby providing a tight and efficient refrigeration seal between the said door and the said frame, as well as an efficient thermal break.

Still a further object of this invention is to provide a door with a novel gasket assembly whereby, upon deterioration of the original gasket, a new gasket may be substituted therefor with a minimum of additional labor, and without requiring disassembly of the original seal.

Still a further object of this invention is to provide a door structure arranged to form an efficient seal with the door frame, wherein a yieldable gasket is sandwiched against the said frame by a resilient ledge surrounding said door, the combined resiliency of the gasket and ledge serving to assure a sealed junction which will not readily become displaced, notwithstanding long use and moderate warping of the door structure.

Still more particularly, it is an object of this invention to form cores of heat insulating panelling or blocks into door structures having highly desirable and economical features.

To attain these objects and such further objects as may appear herein or be hereinafter pointed out, I make reference to the accompanying drawings, forming a part hereof, in which—

FIGURE 7 is a fragmentary sectional view of another embodiment of my invention, illustrating a suggested reorientation of the sealing members;

FIGURE 8 is a fragmentary sectional view of a further embodiment of my invention, suggesting a further reorientation of the sealing members;

FIGURES 9 through 18 are fragmentary perspective views showing details of strip members employed in the various embodiments of my invention;

FIGURE 19 is a horizontal section through a door in accordance with my invention;

FIGURE 20 is a horizontal section through a door in accordance with another embodiment of my invention;

FIGURE 21 is a horizontal section through a door in accordance with another embodiment of my invention;

FIGURE 22 is a vertical section showing details of sill construction;

FIGURE 23 is a vertical section showing details of another embodiment of sill construction;

FIGURE 24 is a horizontal sectional view through the door, employing angular strips in accordance with the embodiment illustrated in FIGURE 17.

The basic component preferably used by me to form the door structures herein described is the material "Styrofoam," a product to which the Dow Chemical Co. has given this name for a plastic foam composition having a non-interconnecting cell system and which is produced by expanding polystyrene approximately forty times its original volume. It should be understood that while I have described my invention in terms of the selected product "Styrofoam," this is by way of example and that other materials may equally be used from the suggestion of the preferred component.

In accordance with my invention, a door 10 comprising a block of expanded polystyrene or the like is provided with front and rear face panels 11 and 12 bonded to the surface of the door 10 as by the use of epoxy resins or other waterproof adhesives. Front and rear face panels 11 and 12 are preferably of a waterproof material, such as fiber glass in the form of sheeting, aluminum, stainless steel or the like. However, plywood painted to provide a waterproof surface has also been used acceptably.

The marginal edges 13, 14, 15, 16, of the door 10 are normally provided with a three quarter inch overlay of plywood or the like, to provide an anchoring point for the hanging hardware of the door. In the normal situation for shipboard installations, the opening to be occupied by the door is, as shown in FIGURE 2, defined by a steel bulkhead but while the construction is illustrated and described in connection with such installation, it should be understood that the structures shown are equally adapted for use with the usual wall constructions.

Figure 1:
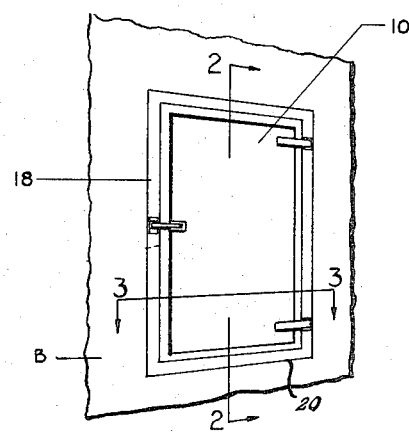
FIGURE 1 is a fragmentary front perspective view of a door assembly in accordance with my invention.
Figure 2:
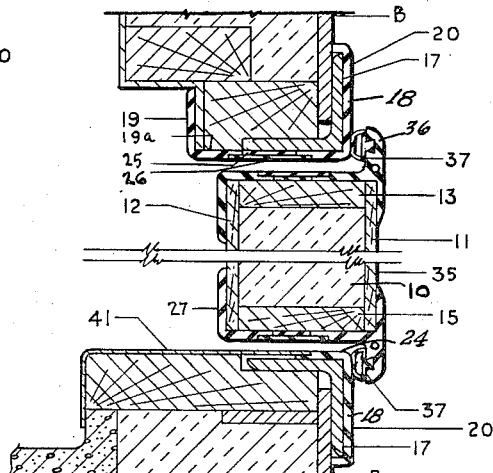
FIGURE 2 is a magnified fragmentary vertical section taken on lines 2—2 of FIGURE 1.
Figure 3:
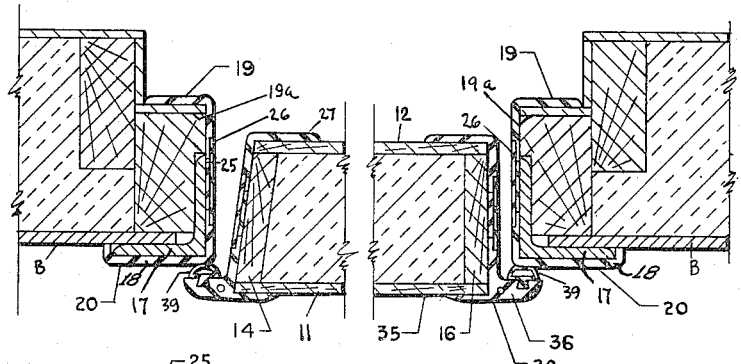
FIGURE 3 is a magnified fragmentary section taken on the lines 3—3 of FIGURE 1.

As seen from FIGURES 2 and 3, the steel bulkhead B forming the top and side margins of the opening is provided with an L-shaped steel angle member 17, welded or otherwise affixed to the bulkhead to define the substantially planar door frame or casing 18. To assure thermal non-conductive efficiency of the frame portion of my closure structure where, as here, the door frame portion is liable to losses by heat transfer by reason of its conductive nature, I provide the said frame with an overlay, preferably of resilient material such as neoprene or other types of synthetic rubbery elastomers, the said overlay serving at the same time to protect the frame.

In accordance with my invention, this overlay comprises inner and outer bands, which bands have applicability independent of the thickness of the installation to be covered, and one or more central bands adapted to span the distance between the inner and outer bands, thereby sealing the edge portions of the structure not covered by the said inner and outer bands. The central bands aforementioned are preferably of a stock material which may be cut to size according to the thickness of the installation encountered, thus enabling the builder to provide an edge-sealed closure for structures of a wide variety of thicknesses.

Figure 4:
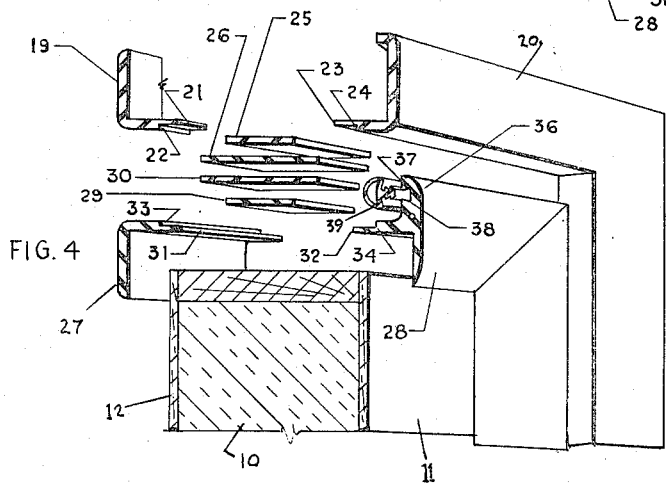
FIGURE 4 is a magnified sectional exploded view, to show the relationship of the parts prior to assembly.

As best seen from FIGURES 2, 3 and 4, an angular overlay 19, comprising an extended band, is applied over the inner edge corner 19a of the said frame or casing and the said band is continued to be applied about the entire inner edge corner periphery of the said casing or frame. Where necessary, the band 19 may be cut and mitred in a manner well known in the art, thereby assuring a continuous sealed band about the entire inner periphery of the inner door frame.

In like manner, the band 20 is applied about the outer corner periphery formed by the door casing or frame 18.

It will be readily recognized that the performance of the aforesaid operation will result in the formation of a door frame structure having sealed inner and outer corner marginal edges, it being now only necessary to fill the space between the inner edge marginal portions of the first and second seals aforementioned to provide an entirely sealed door frame portion.

Sealing of the remaining edge portion is accomplished in my device by overlaying thin, flat filler strips closely adjacent the edge marginal portions of the front and rear bands.

To assure a tight sealing joint between the filler strips and the corner covering bands 19 and 20, I have provided the inner edge marginal portions of the said bands 19 and 20 with stepped shoulders 21, 22 and 23, 24, respectively.

As heretofore mentioned, the band portions being of stock material will, when applied to doors of various thickness, leave greater or smaller spaces between the said stepped shoulders, depending upon the thickness of the door or door frame covered. Accordingly, my sealing structure is made universally applicable by providing filler strips 25 and 26, which may preferably be cut from stock material to the exact thickness to join the said stepped shoulders.

Accordingly, in the illustration (see FIGURES 3 and 4), a narrower inner filler strip 25 is cut exactly to span the distance between the inner shoulders 21 and 23 of the inner and outer bands 19 and 20. When the said filler strip has been adhesively or mechanically secured in position to fill the space between the said inner shoulders, the wider strip 26 may then be overlaid atop the first said filler strip to span the distance between the upper pair of inwardly directed shoulders 22 and 24. The provision of superimposed bands or filler strips 25 and 26 is a further factor tending to assure a sealing fit over the entire surface of the door casing 18.

In similar manner, the outer peripheral edge portions between the faces of the door 10 are also supplied with a sealing overlay. For this purpose, an inner angular seal or band 27 is applied to the inner corner peripheral portion of the door and the outer angular seal band 28 is applied to the outer peripheral portion of the door. In similar manner as applied to the casing enclosure or frame, door filler strips 29 and 30 are applied over the marginal edge portions of the door uncovered by the opposed corner bands 27 and 28. As in the case of the door casing, the filler strips 29 and 30 span the entire distance between the stepped shoulders 31, 32 and 33, 34 of the bands 27 and 28.

Figure 5:
FIGURE 5 is a magnified section of a gasket detail prior to assembly in my device.
Figure 6:
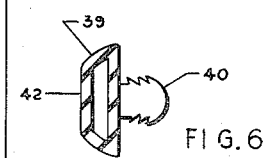
FIGURE 6 is a magnified sectional view of a gasket, illustrating the configuration of such gasket in the closed door position of my device.

The corner band 28 which is overlaid about the junction of the front face 35 of the door 10 and the marginal edge thereof is provided, in addition, with an outwardly extending resilient ledge portion 36. This ledge portion 36 is of a size to span the peripheral space between the door 10 and the door frame 18, thereby providing a seal between the door and the frame. The rearwardly directed face 37 of the extending ledge portion 36 is provided with a continuous annular recess 38, preferably of dove-tailed shape in cross section, as best seen in FIGURES 2, 3 and 4. A continuous length of yieldable gasket 39, preferably of a soft, cold-resistant rubber, is provided with an anchoring shank or base portion 40, as shown in FIGURES 5 and 6. The shank portion 40 of the gasket 39 contains a series of angular ridges or barbs arranged to be forced within the dove-tailed recess 38 in the ledge 36 and, as will be readily recognized from the construction of the anchoring base and dove-tailed recess, will be retained within the said grooves after once being forced therein unless deliberate attempts are made to remove it therefrom.

As will be seen from FIGURE 2, the sill portion of the door frame may optionally contain only the front band member 20, with additional resistance to wear as by repeated entry and foot scuffing being provided by a steel sill 41 which abuts against the upper shoulder 24 of the said band 20 and continues backwardly.

With a door and door frame as above described, hung by hinges which by reason of the lightness in weight of the door need not be too massive, it will be seen that the angular extending ledges 36 and gasket 39 will, in the closed position of the said door, abut directly against the outer band member 20, about the frame 18, and provide an exceedingly tight fit without requiring the door to be tightly dogged or forced against the frame, by reason of the resilient gasket and ledge structure herein provided.

In FIGURE 5 a gasket, before insertion in a recess 38, is shown in its unflexed or open position. In FIGURE 6 the same gasket is shown in the form in which it would appear in the closed position of the door, the flattening of the forward end 42 of the said gasket being effected by its contact against the outer band member 20 of frame 18. As will be recognized from FIGURES 5 and 6, the provision of a hollow gasket contributes to the yieldability of the sealed joint.

A further factor contributing to the tight sealing effect of my device is the resilient nature of the extending ledges 36. The combined yieldability of the gasket and resilient ledges 36 will be found, in a measure, to compensate for warping in the door or in the door frame, and thereby a tight seal is provided, notwithstanding moderate warping of the latter two structures.

While the illustrations of FIGURES 2, 3 and 4 indicate a structure wherein both the door and the casing have edge insulating bands and fillers, it should be recognized that where high efficiency insulation of the edge portion of the casing or door is not of prime importance, the bands and filler arrangements may be applied to one or the other of these said structures, without departing from the spirit of my invention.

Likewise it is possible to utilize my novel filler strip and sealing arrangement with a wide variety of doors and door frames or casing. Accordingly, I have in FIGURES 7, 8, 19, 20, 21 and 24 illustrated embodiments of my invention utilizing various extruded shapes of door seal band members. Where possible, parts of the embodiments of FIGURES 7, 8, 19, 20, 21 and 24 have been renumbered with the same numerals used in describing the equivalent parts in the embodiments of FIGURES 2, 3 and 4.

In FIGURE 7 there is shown a door and frame closure utilizing the extrusions shown in FIGURES 9, 10, 12, 13 and 16. For this arrangement, the door 10 is provided with an extension 43. The rear edge junction of the frame 18 is covered by the L-shaped band or seal 19 (FIGURE 10), and the front edge junction of said frame by the seal 20 (FIGURE 9). The door 10 of the embodiment of FIGURE 7 is protected by the seals 19, 28 (FIGURE 16) and a second band or extension of shape 19. Sealing of the areas between the edge seals 19 and 20 of the frame 18 is accomplished by the filler strips 25 and 26, which span the steps 21 to 23 and 22 to 24. In similar manner, the area between the seals 19 and 28 of the door is closed by filler strips 29 and 30, cut to the proper size of the gap, spanning steps 21 to 32 and 22 to 34. The groove 38 retains the shank 40 of gasket 39, the latter in the closed position of the door engaging the seal 20 to form a tight closure. The extension 20a of seal 20 overlaps an angle iron 17, thus providing additional thermal efficiency.

The embodiment of FIGURE 8 utilizes the extrusions depicted in FIGURES 9, 10, 12, 13 and 16. In this embodiment, the frame 18 is provided with an extension 43'. The frame edge portions are sealed by angular edge seal bands 19, 20 and 19, while the door edge portions are sealed by the members 28 and 19. The spaces between the outwardly directed steps 32 and 34, 21 and 22 of the door seal members 28 and 19 are filled by filler strip 29 and overlaid strip 30, respectively. The frame portions not covered by members 19, 20 and 19 are likewise sealed, the strips 25 and 26 spanning, respectively, the spaces between steps 21 to 21 and 22 to 22. The exposed portions of angle iron 17, in this embodiment, are covered by overlaid filler strips 30 and the extension portion 20a. In this embodiment of FIGURE 8, sealing between door and door frame is accomplished by contact of the gasket 39, whose shank 40 is retained in groove 38 with an angular band or seal 19.

The door embodiments shown in FIGURES 19 and 20 utilize similar sealing components, but the door structures of these embodiments differ in that FIGURE 19 depicts a structure utilizing a heavy wooden structure C surrounding the core, while the core-surrounding structure D of FIGURE 20 is relatively less thick, comprising plastic or sheet metal, for instance.

The seals or bands used in the door structures of FIGURES 19 and 20 are depicted in FIGURES 10, 11 and 13, in which the stepped shoulders are outwardly faced. In these structures, the rear door corner junctions are covered by L-shaped bands 19 and the front door corner junctions by bands or seals 28–a. In both instances the spaces between stepped shoulders 21 and 32 of the rear and front bands, respectively, are covered by filler strips 29 and the spaces between outer spaced shoulders 22 and 34 by the filler strips 30, each cut to a width proportioned to the thickness of the core, after facing sheets 11 and 12 of resin bonded fibre glass are applied. In these embodiments, the front seals 28–a are provided with peripherally extending overhang 36, having grooves 38 for retention of the shanks 40 of gaskets 39.

In FIGURE 21 there is illustrated a door structure embodiment utilizing the band or seal extrusions illustrated in FIGURES 14 and 15, which do not employ stepped shoulders. In this door structure, the filler strips are eliminated, the core of the door being covered by laminae of overlaid material E, preferably of a thermally non-conductive nature. In this embodiment, the rear corner junction of the door is covered by an angular band or seal 27'' and the front corner junction by the seal 28'. The seal 28' is provided with a peripheral overhang 36 having a gasket-retaining groove 38 for the purpose previously described.

The door structure embodiment illustrated in FIGURE 24 utilizes the extruded bands or seals depicted in FIGURES 17 and 18. In this embodiment, the rear corner junction is covered by seal member 27' and front corner junction by seal member 28''. Since the stepped shoulder 33' of the rear seal 27' and the stepped shoulder 34' of the front seal 28'' are inwardly faced, it is necessary in this embodiment to apply filler strip 29' prior to the application of strips 27' and 28'', which filler strip 29' is cut to fit the gap between the shoulders 33' and 34'. Strip 28'' is provided with overhang 36 and groove 38 for the purposes previously described in connection with the other embodiments.

In certain installations as, for instance, where a concrete floor is involved, it may be found undesirable or impracticable to provide a ledge closure structure as aforesaid for the floor portion of the door member. Accordingly, in such installations I provide the floor marginal edge of the door with bands 44, 45, and flexible rubber seals 46, 47, depending from the bottom marginal edge of the door to form a seal with the floor or sill portion 48, as seen in FIGURES 22 and 23. These flexible rubber gasket members may be retained on the bottom of the edge of the door, as by the forcing or wedging influence of a wood block 49 secured by screws or other means to the bottom marginal edge of the door.

By my invention I have provided a means of using lightweight door materials of high insulating value which have heretofore been restricted in their use by reason of their semi-permeable nature and the expense incident to sealing such materials. The door core to be employed need not be rabbetted or stepped edgewise to overlap the frame opening but merely requires conformation to the opening with due rake for thick door panels, as will be readily understood.

I have further provided novel door structures having exceedingly light weight, and having, furthermore, the ability to conform to a degree to compensate for warped casings or frames, and also for warping of the door structure itself.

As will be readily recognized, the gaskets for my door structures and the novel means of retaining the said gaskets on the ledges permit replacement of the gasket with a minimum of effort, it being necessary merely to grasp and unseat one portion of the gasket from the retaining recess and draw or pull the remainder of the gasket from the recess.

Likewise the said gasket may be replaced by fresh gasket material and the sealing juncture of the closure and casing may thus be restored with the minimum of time and attendant labor.

It will furthermore be recognized that the edge portions of the doors and the door frames may be insulated and sealed without requiring an entire varying sealant structure for each thickness of door or frame to be sealed, by reason of the novel, expandable closure means herein described.

The material of the seal members particularly shown in FIGURES 9 to 11 and 13 to 18 as used herein to carry out my invention has been designated as made of a neoprene plastic in that it combines properties, both physical and structural, especially requiring no independent support, in the production of the refrigerator door and door assembly incorporating resiliency and lightness of weight and hardness, whereby more than 60% of the weight of the door assembly is saved, without sacrificing any physical properties. Accordingly, my construction combines sturdiness of structure and an adaptability to door sizes which, in connection with the first named properties, effects very substantial economies. The flexibility of the seal members makes for operating safety not procurable by the costly rabbetted or like flanged rigid doors, and I therefore deem it desirable to observe that in using the term "seal member" in its combined sense of rigidity and flexibility, it is occasioned by my preferred use of neoprene of a hardness having a Durometer number 85.

I have found that where a door in accordance with my invention is embodied in a refrigerator door in which low temperatures are experienced to both sides of the door, such as at least —10° F. on one side and about 0° F. on the other, that the parts, FIGURES 9 to 11, 13 to 18, may be employed of a hardness on the Durometer scale of number 85 and exhibit adequate flexibility in accordance with its herein intended purpose. A decrease in the temperature to each side of the door may find it desirable to employ a lower hardness in terms of a lower Durometer number and, conversely, with a rise in temperature which may be encountered to both sides of the refrigerator door, the resiliency required may permit the utilization of material employed for the seal member of a hardness having a higher Durometer number.

Likewise it will be understood that while the preferred form of my invention is illustrated for refrigerator doors, some benefits may be secured in doors where a degree of soundproofness may be found desirable.

It will also be understood that while I have exemplified neoprene for the seal material, especially of FIGURES 9 to 11 and 13 to 18, this material is given by way of example, and those skilled in the art of simulating the properties of neoprene may have suggested to them other suitable materials.

This application is a continuation of application Serial No. 770,659, filed October 30, 1958, now abandoned.

What is claimed is:

1. A sealing closure for a door frame comprising, in combination, a door member having front and rear face panels and of a dimension to provide a substantially uniform clearance between the peripheral edges of the door and the frame, a rear peripheral door seal member comprising an extruded angular impervious synthetic elastomeric overlay secured entirely about the adjacent portions of the corner junction formed by the edges and rear face panel of the door, a front peripheral door seal member comprising an angular impervious synthetic elastomeric overlay secured entirely about the adjacent portions of the corner junction formed by the edges and front face panel of the door, said front seal member including a resilient abutment portion extending outwardly to form a continuous bead about said door, of a dimension to span in an unsupported relation said peripheral clearance between the door and frame, and a filler strip member secured about said door edge and forming continuous sealing joints with opposed portions of said front and rear overlays, said overlays each comprising two leg portions, one said leg portion covering a face marginal portion of each of said corners and the other said leg portion covering an edge marginal portion of each of said corners, the opposed edge marginal leg portions of said overlays being provided with stepped shoulders and the lateral edges of said filler strip member being received in the stepped shoulder portions of said edge marginal leg portions, whereby said filler strip and said edge marginal leg portions form a substantially flush surface.

2. A sealing closure for a door frame comprising, in combination, a door member having front and rear face panels and of a dimension to provide a substantially uniform clearance between the peripheral edges of the door and the frame, a rear peripheral door seal member comprising an extruded angular impervious synthetic elastomeric overlay having leg portions secured entirely about the adjacent portions of the corner junction formed by the edges and rear face panel of the door, a front peripheral door seal member comprising an angular impervious synthetic elastomeric overlay secured entirely about the adjacent portions of the corner junction formed by the edges and the front face panel of the door, said front seal member including a first leg portion covering the edge marginal portion of said corners, a second leg portion covering the face marginal portion of said corners and a resilient third leg portion coplanar with said second leg portion and projecting outwardly of said second leg portion to form a continuous unsupported abutment portion to span said peripheral clearance between the door and the frame and to resiliently bear against a face portion of said frame, and filler strip means having lateral edge portions forming continuous sealing joints with opposed edges of the legs of said front and rear door seal members overlying the edge portions of said door.

3. A closure in accordance with claim 2 wherein said abutment portion is provided with a yieldable gasket arranged in the closed position of said door, to be sandwiched between said frame and said abutment.

4. A closure in accordance with claim 2 wherein said abutment portion includes a continuous recess on the rearwardly directed face, and a yieldable gasket having an anchoring base arranged to be releasably retained within said recess, said abutment portion in the closed position of said door serving sealingly to sandwich said gasket against said frame.

5. An impervious door closure structure for refrigerated spaces comprising a door frame defining and opening and a door having front and rear face panels and a planar edge extending to the opposite face panels thereof fitted within said frame, means for sealing the peripheral portions of said door relative to said frame when the door is in its closed position, said sealing means comprising a resilient impervious member, said member comprising a first leg portion lying in continuous transverse contact with edge marginal portions of said door, a second leg portion at right angles to said first leg portion and covering face marginal portions of the front face panel of said door, and a third leg portion coplanar with the second leg portion and projectiing outwardly of the edge portion of said door throughout the width thereof and forming a resilient unsupported bead in opposed relation to face portions of said frame, a gasket mounted on the inner face of said bead for abutting the face portions of said frame, said bead resiliently urging said gasket against the face portions of said frame.

6. A closure as in claim 5 wherein said bead is formed with a recess on the inner surface thereof, said gasket including deformable anchor means frictionally receivable in said recess.

7. A sealing closure for a door frame including face portions comprising in combination, a door member having front and rear face panels extending to the edges thereof and fitted in said frame to provide a substantially uniform clearance between the peripheral edges of the door and the frame, said door having peripheral edge portions defining planar wall surfaces, each such wall surface extending from the front face panel to the rear face panel of the door member, a rear peripheral seal member comprising an angular impervious extruded synthetic elastomeric overlay secured entirely about the adjacent portions of the corner junction formed by the edges and rear face panel of the door, a front peripheral seal member comprising an angular impervious extruded snythetic elastomeric overlay secured entirely about the adjacent portions of the corner junction formed by the edges and front face panel of the door, said front seal member including an abutment portion projecting outwardly of the edge of said door to form a continuous, unsupported bead spanning the peripheral clearance between the edge of said door and said frame, said bead having an inner surface portion in opposed relation to the face portions of said frame, and a filler strip member mounted on the edges of said door, said strip being disposed between opposed edge portions of said front and rear overlay members and having width sufficient to form continuous sealing joints with the last-mentioned opposed edge portion.

8. A closure as in claim 7 wherein said abutment portion includes a yieldable gasket on the inner surface thereof for engagement with the face portions of said frame.

9. A closure as in claim 8 wherein said front overlay is formed of resilient material, and comprises a pair of leg portions at right angles to each other and respectively disposed over edge and front face panel portions of said door, said abutment portion being substantially coplanar with the leg portion disposed over the face panel portion of said door.

References Cited by the Examiner

UNITED STATES PATENTS

| 2,076,821 | 4/37 | Lipman | 20—35 |
| 2,123,403 | 7/38 | Connelly | 20—35 |
| 2,180,886 | 11/39 | Thomas | 20—35 |
| 2,242,421 | 5/41 | Dodge | 20—35 |
| 2,267,279 | 12/41 | Kuenzli | 20—35 |
| 2,329,647 | 9/43 | Philipp | 220—9 |

FOREIGN PATENTS

| 208,449 | 5/57 | Australia. |
| 1,121,089 | 1/62 | Germany. |

HARRISON R. MOSELEY, *Primary Examiner.*

N. ANSHER, *Examiner.*